L. FELBER.
AXLE SPINDLE.
APPLICATION FILED AUG. 25, 1914.
1,150,753.
Patented Aug. 17, 1915.
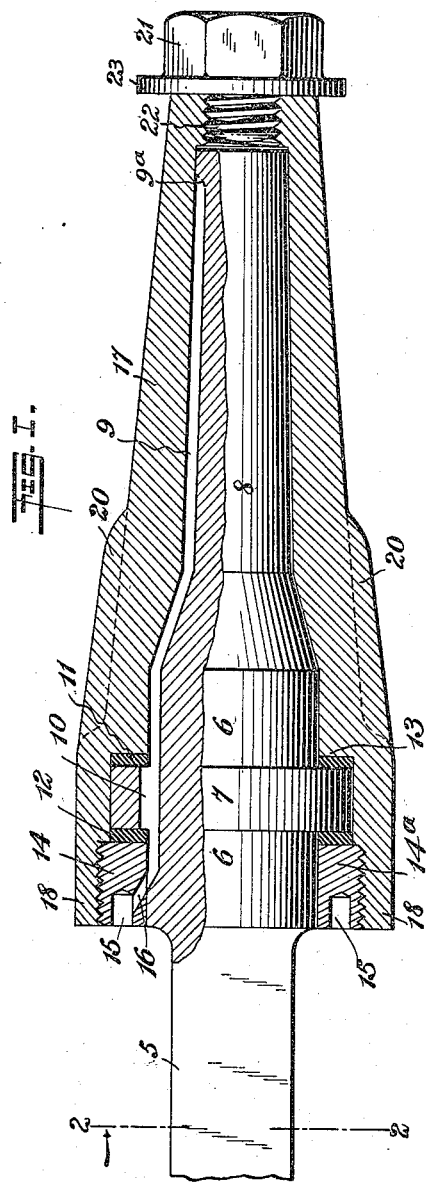
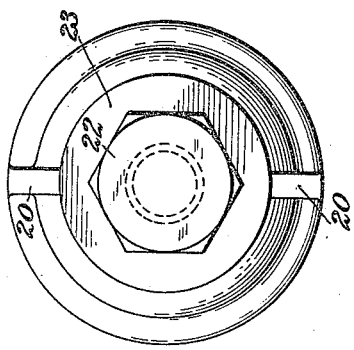
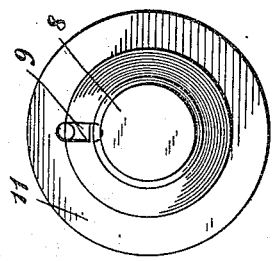
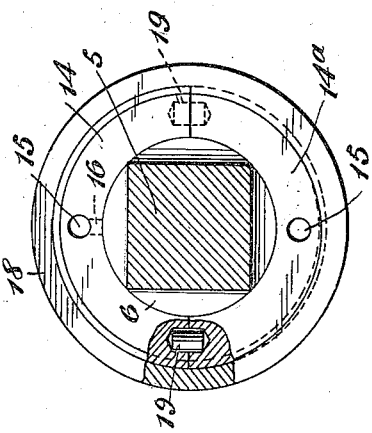
WITNESSES
G. Robert Thomas
Walton Harrison
INVENTOR
Lorenz Felber
BY
Munn & Co
ATTORNEYS

UNITED STATES PATENT OFFICE.

LORENZ FELBER, OF FRANKLINTON, LOUISIANA.

AXLE-SPINDLE.

1,150,753.　　　　　Specification of Letters Patent.　　Patented Aug. 17, 1915.

Application filed August 25, 1914.　Serial No. 858,423.

*To all whom it may concern:*

Be it known that I, LORENZ FELBER, a citizen of the United States, residing at Franklinton, in the parish of Washington and State of Louisiana, have invented certain new and useful Improvements in Axle-Spindles, of which the following is a specification.

My invention relates to axle spindles and more particularly to means for enabling the same to be lubricated without the necessity for attaching or removing the wheel or wheel box, or from disarranging any other part from its normal position.

My invention further comprehends means for protecting the spindle and parts immediately associated therewith from the action of dust and dirt.

My invention also contemplates an improved form of lock for detachably holding the wheel box in position.

In addition my invention relates to a number of distinct improvements in devices of this general character, for the purpose of increasing the efficiency thereof.

Reference is made to the accompanying drawings forming a part of this specification, and in which like letters indicate like parts.

Figure 1 is a view partly in section and partly broken away showing my improved axle spindle. Fig. 2 is a section on line 2—2 of Fig. 1 looking in the direction of the arrow, certain parts being broken away. Fig. 3 is an end elevation of the spindle. Fig. 4 is an end elevation of the wheel box, which contains the spindle.

The axle is shown at 5 and the spindle at 6. The spindle is provided with a portion 7 of enlarged diameter, and also with a shank portion 8. The spindle is further provided with an oil groove 9 extending almost the full length of the spindle and terminating blindly at the point 9ª, near the outer end of the spindle. The enlarged portion 7 of the spindle is provided with a hole 10, which forms practically a continuation of the groove 9. A pair of annular washers 11—12 are disposed upon opposite sides of the portion 7 of enlarged diameter, the washer 11 engaging an annular shoulder 13. At 14 and 14ª are shown two substantially semi-circular parts together forming a two-part collar. This collar encircles the spindle, is threaded externally and fitted into a thin annular portion 18 of a wheel box 17. This wheel box has the usual frusto-conical form peculiar to a wheel box. The two part collar is provided with wrench holes 15 to enable the collar to be turned by aid of a spanner wrench. The part 14 of the collar is provided with a groove 16 which merges into the adjacent hole 15, and with the various parts occupying the positions indicated in Figs. 1 and 2, the groove 16 is connected with the groove 9 so as to form practically a single continuous groove. The two parts 14—14ª of the two-part collar are connected together by dowel pins 19, as may be understood from Fig. 2. The wheel box 17 is further provided with ribs 20.

A nut 21 is provided with a threaded stem 22 which fits into the adjacent end of the wheel box 17, the said end being threaded internally to receive it. The nut 21 is further provided with a flange 23 integral with it, and adapted to lodge against the adjacent end of the wheel box. By making the collar 14—14ª in two parts, connected together by dowel pins 19, as above described, the collar serves the purpose of a lock, and thus prevents the wheel box from becoming unscrewed under ordinary conditions of service.

By turning the wheel box 17 into the position indicated by Figs. 1 and 2 so as to connect the groove 16 with the grooves 9, oil may be fed into these grooves through the adjacent wrench hole 15. Then as the wheel box turns the oil is unable to make its escape, because of the disconnection of the groove 16 from the groove 9. The packings 11—12 prevent retrogression of the oil from the groove 9, and the result is that the oil is unable to make its escape. The spindle may, therefore, be oiled without the necessity for removing the wheel box, or for displacing any part from its normal position.

I do not limit myself to the precise construction shown, as variations may be made therefrom without departing from the spirit of my invention.

Having thus described my invention, what I claim as new and desire to secure by Letters Patent is as follows:—

1. The combination of a spindle provided with a portion of enlarged diameter and having a general annular form, said spindle having an oil groove extending along its general length and through said portion of enlarged diameter, a wheel box encircling said spindle and provided with a thread, and a split collar carried by said spindle and provided with a thread for engaging said thread of said wheel box, said split collar serving as a lock to prevent said wheel box from becoming loosened relatively to said spindle.

2. The combination of a spindle provided with an enlarged portion of annular form and provided with a groove extending longitudinally of the spindle and with a hole extending through said enlarged portion and communicating with said groove, a packing engaging said enlarged portion of said spindle, a wheel box fitting upon said spindle and provided with a shoulder engaging said packing, and means for introducing oil into said groove.

3. The combination of an axle provided with a spindle, said spindle having a groove extending in the direction of its length, a wheel box encircling said spindle, a packing located between said wheel box and said spindle and a collar encircling said spindle and screwing in said wheel box, the said collar being provided with wrench holes and having a groove leading from one of said holes and adapted to be brought into registry with the groove of said spindle.

4. A device of the character described comprising a spindle provided with an enlarged portion of annular form and with a hole extending through said enlarged portion, said spindle being further provided with a groove extending in the approximate direction of the length of said spindle and communicating with said hole, a collar encircling said spindle, a wheel box encircling said spindle and secured to said collar and a packing engaging said enlarged portion of said spindle, and also engaging said wheel box.

5. A device of the character described comprising a spindle provided with an enlarged portion of annular form and further provided with an oil groove, said enlarged portion having a hole extending through it, and communicating with said oil groove, a two-part collar encircling said spindle and provided with a groove which may be brought into registry with said groove of said spindle, and a wheel box detachably secured to said two-part collar and revoluble therewith relatively to said spindle.

6. The combination of a spindle provided with an enlarged portion of annular form and with an oil groove, a packing engaging said enlarged portion, a wheel box encircling said spindle and said packing, a two-part collar engaging said wheel box and carried thereby, said collar being threaded externally and said wheel box being provided with a portion threaded internally to fit said collar, and a plurality of dowel pins connecting the two parts of said collar together.

In testimony whereof I have signed my name to this specification in the presence of two subscribing witnesses.

LORENZ FELBER.

Witnesses:
Geo. J. Untereiner,
Edwin McGuire.

Copies of this patent may be obtained for five cents each, by addressing the "Commissioner of Patents, Washington, D. C."